Figure 1:
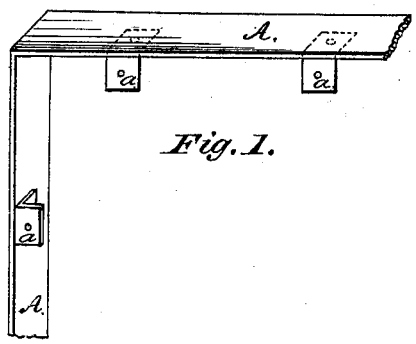

W. H. BUTLER.
FIRE-PROOF SAFE.

No. 188,775. Patented March 27, 1877.

Witnesses:

Inventor

3 Sheets—Sheet 2.
W. H. BUTLER.
FIRE-PROOF SAFE.
No. 188,775. Patented March 27, 1877.
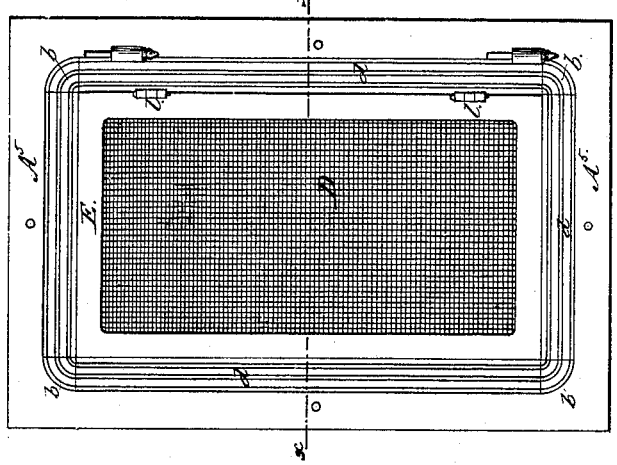
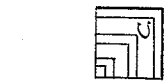
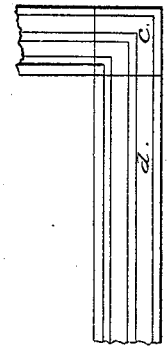
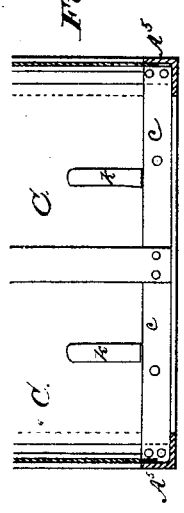
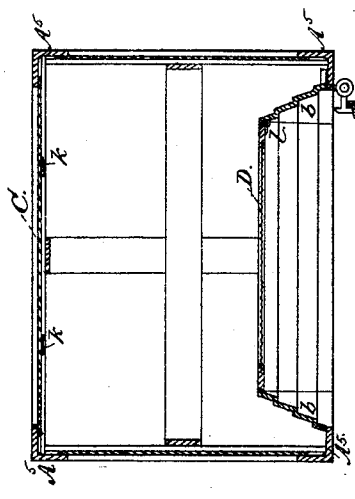
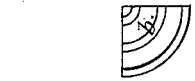
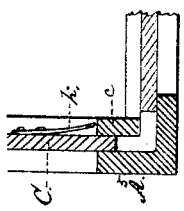
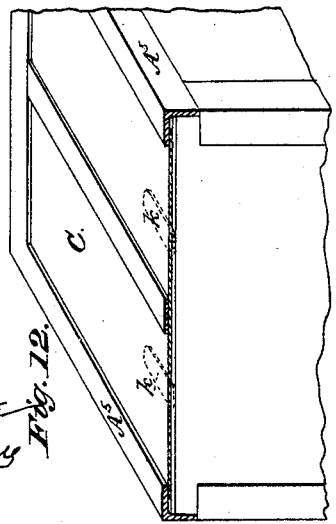
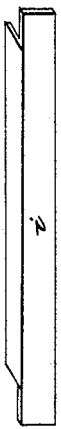
Witnesses:
Inventor:

W. H. BUTLER,
FIRE-PROOF SAFE.

No. 188,775. Patented March 27, 1877.

3 Sheets—Sheet 3.

Witnesses:

Inventor:

UNITED STATES PATENT OFFICE.

WILLIAM H. BUTLER, OF BROOKLYN, NEW YORK.

IMPROVEMENT IN FIRE-PROOF SAFES.

Specification forming part of Letters Patent No. 188,775, dated March 27, 1877; application filed January 29, 1877.

*To all whom it may concern:*

Be it known that I, WILLIAM H. BUTLER, of Brooklyn, in the county of Kings and State of New York, have invented certain new and useful Improvements in Fire-Proof Safes; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The object of my invention is to produce a safe that is strong, durable, neat, and can be furnished at a very reasonable cost.

As is well known to those skilled in the art, the frames of safes were first made of flat bars of iron or steel, which were bent at the corners, and to them the plates forming the sides, bottom, top, and ends were secured by knee-plates. The next step in the art was to use bars edgewise, secure them together at the corners, and then secure the knee-plates to these bars. The two were then combined—that is, the flat bars and the edgewise bars were united by knees, and thus formed an angle-iron. When the art of rolling angle-iron became known, they were united together at the corners, and secured by angular flat plates. Finally, the bending and welding of bars of angle-iron, forming a continuous frame, was a great improvement on the mitered frame, forming a very superior frame, in every respect, over the original flat-bar frame, as first described. The original frame and the angle-iron frame, as heretofore used, formed a square corner outside and inside of the frame.

The first part of my invention relates to the construction of the door-frame, which necessarily follows the contour of the angle-iron frame of the safe.

The second part of my invention relates to the manner of putting in and securing the safe-back in position.

The third part consists in providing safes with an inner wire-gauze screen or door, inside of the main door, either hinged or fastened in any manner, to prevent books, &c., from burning, in case the safe should fall over during a fire.

It further consists in strengthening the angle-iron frames by welding into the corners an additional piece, and thus giving greater stability and beauty to the frames, as will be more fully described hereinafter, reference being had to the accompanying drawings, in which—

Figures 1, 2, 3, 4, 5, and 6 show the several progressive steps in making the frames of safes previous to my invention. Fig. 7 is a perspective detail view of the former manner of securing the back of the safe by knees and screws, with the back removed. Fig. 8 is a front view of my improved safe with the front door removed, showing the inner screen or door. Fig. 9 is a horizontal cross-section on line $x\,x$ of Fig. 8. Fig. 10 is a detail elevation, showing the manner of securing the back of the safe. Fig. 11 is a detail view, showing the manner of constructing the door-frame. Figs. 12 and 13 show the manner of finishing the back of the safe.

In the drawings, Figs. 1, 2, 3, and 4 represent the different modes of constructing the frames of safes, and the knee-plates by and to which the plates were secured to the frames previous to my invention.

Figure 2:
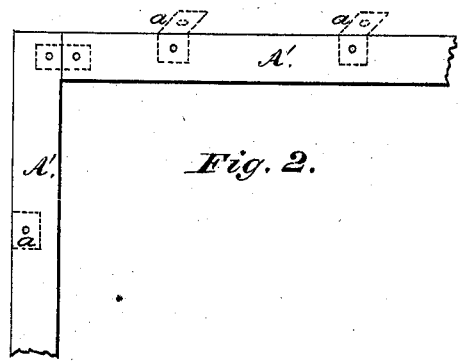
Figure 3:
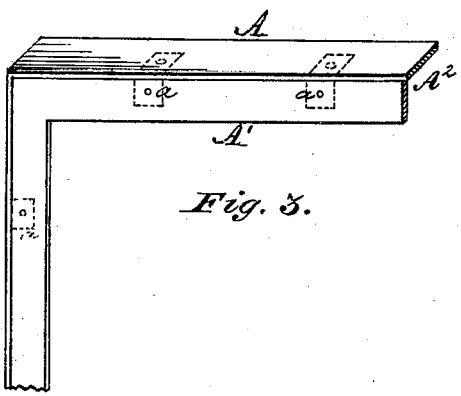
Figure 4:
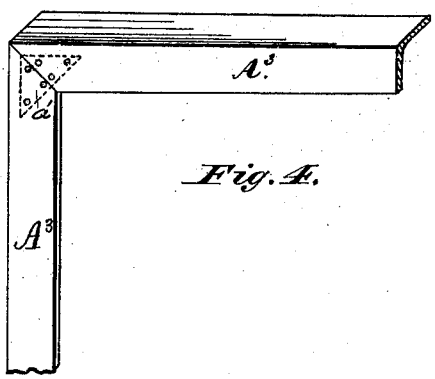

In Fig. 1 the flat bar A is shown bent flatwise, to which the bar $A^1$, Fig. 2, is secured by the knee-plates $a\,a$, the two forming a compound or angle bar, $A^2$, as seen in Fig. 3. This frame was improved, when the art of rolling angle-iron became known, by making the bars $A\,A^1$ in one solid straight piece, as shown at $A^3$ in Fig. 4, then mitering two together, and securing them by means of the angle-plates $a'$ and rivets or screws.

Figure 5:
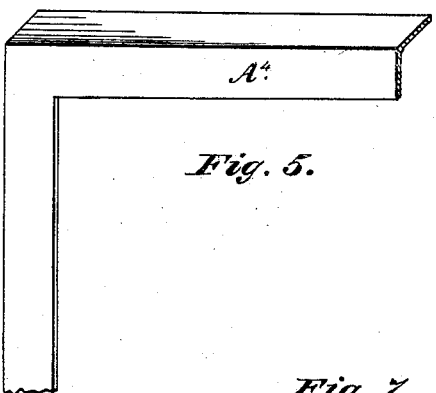
Figure 6:
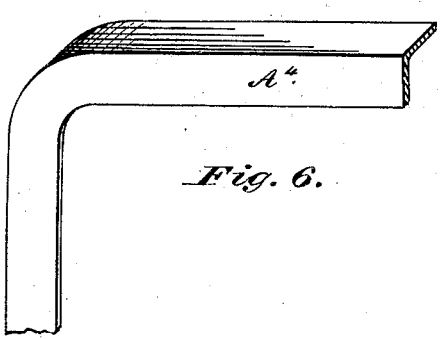
Figure 7:
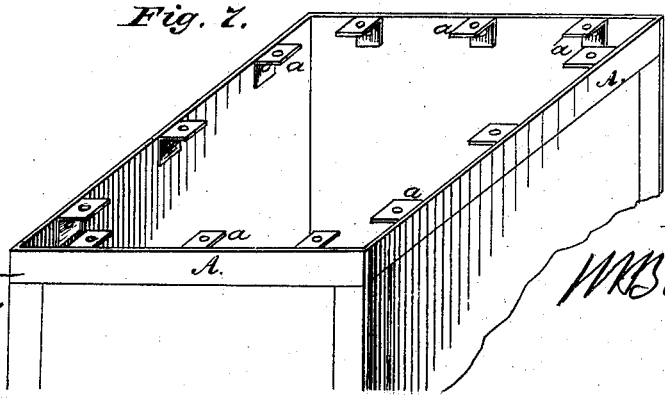
Figure 14:
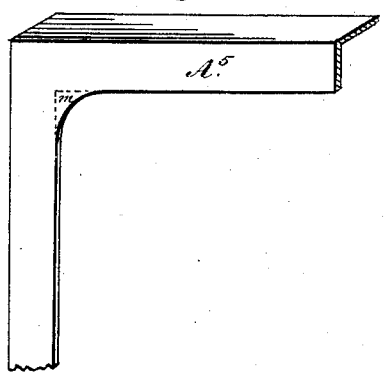
Figure 15:
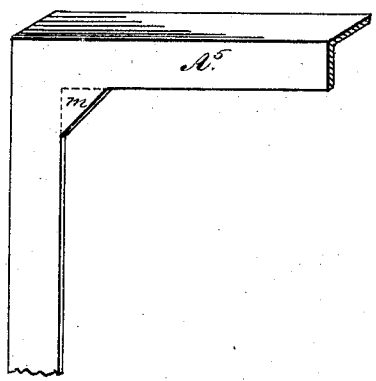
Figure 16:
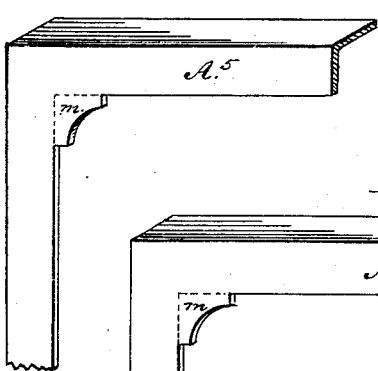
Figure 17:
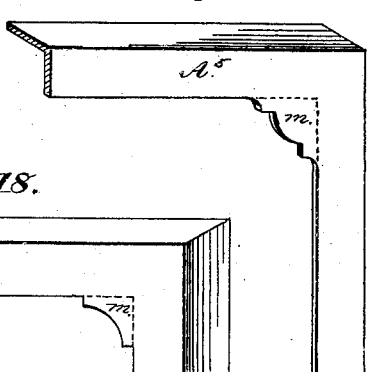

Finally, by bending and welding the angle-irons together, either with square or round corners, as shown in Figs. 5 and 6, a continuous frame, $A^4$, was made, to which the door-frame and the door corresponded in contour. This door-frame is usually made of cast-iron, and patterns are required for all the different sizes of safe-doors, causing great additional expense and inconvenience.

To obviate this difficulty and objection is the first object of my invention. I therefore make the flange B of the door and the door-frame in sections, by first casting the corners, either round or square, as shown at $b\,c$, Fig.

11, separately; then place them the desired distance apart, and fill in the spaces between them with the straight pieces $d$, which are made of any length required.

In regular or ordinary sized safes the door-frame can be made in one piece, cast from patterns made as described; but for irregular or unusual sizes I make the door-frames themselves in sections, as described for doors.

The corner-pieces $b$ and $c$, Fig. 11, are not confined to any particular shape, but the form shown at $b$ seems preferable, giving greater strength than the square corner. The lower corners may be made square, and the upper ones rounded, or of other suitable shape.

The door-flange B, Fig. 9, is made with a rim, strip, or shoulder, $f$, projecting from its inner edge on every side excepting either the top, bottom, or one side, which is left open for the introduction of the cover or panel $g$, which is slid under the projection $f$ and over the well or lock-casing $h$, and when the panel $g$ is in position the lock-casing projects through an opening formed in the panel for that purpose, and assists in holding the panel in place. The opening through which the panel is inserted when the said panel is in position is closed by a strip of metal of the same shape as the projection $f$, and said strip is secured by screws. This plan gives a smooth surface to paint, saves a large number of screws and tapping of holes, and allows for expansion by heat, as only one edge is fastened by the screws.

Now, with reference to the third part of my invention, which relates to the manner of putting in and securing the back of the safe.

Heretofore the backs of safes were secured by means of knees $a$, Fig. 7, with screws which were passed through the back and into the knees; or the back of the safe has been slid under the inner flange of the back angle-iron frame.

I slide the back C of the safe under the inner flange of the back angle-iron, Figs. 9, 10, and 12, and secure it by means of the angle-iron bar $i$, Fig. 13. The back C is provided with spring-pieces $k$, which, when the back is slid into its proper position, spring out and bear against the bar or rod, and thereby prevent the back being withdrawn, even if the bar $i$, Fig. 13, be removed. In this manner the back of the safe is put in cheaply, it allows ample room for expansion when heated, and admits of a better finish. The back casters or wheels go over the bar $i$, Fig. 13, necessitating their removal before the bar $i$ can be displaced.

Now, with reference to the fourth part of my invention, which consists of an inner screen or door inside of the main door of the safe, either on hinges or fastened in any way. Inside doors, either of metal or wood, and either filled with fire-proof material or not, have long been in use as a protection against fire and sneak-thieves.

I make a door or screen, D, Figs. 8 and 9, of wire gauze or netting, secured in a suitable frame, E, and fasten it with hinges $l$ $l$ or otherwise to the flange of the safe-door or to the door-frame, as most desired. This screen will prevent the flames from entering the interior of the safe, where the books and papers are stored. It will also prevent the books and papers from falling against the hot metal of the door in case the safe should fall in a building being consumed by fire. It also allows the vapor from the fire-proof filling to circulate between the inside of the outer door and the contents of the safe.

The fifth part of my invention consists in welding into the corners of the angle-iron frames, as heretofore used, filling or corner pieces either triangular, curved, or ornamental, as shown at $m$, Figs. 14, 15, 16, and 17, by which the frames are greatly strengthened, especially where most needed, and also improved in appearance. If desired, the upper corners may be provided with filling-pieces, and the lower ones left square. These corner or filling-pieces may be secured in any other suitable manner, if desired.

Figure 18:
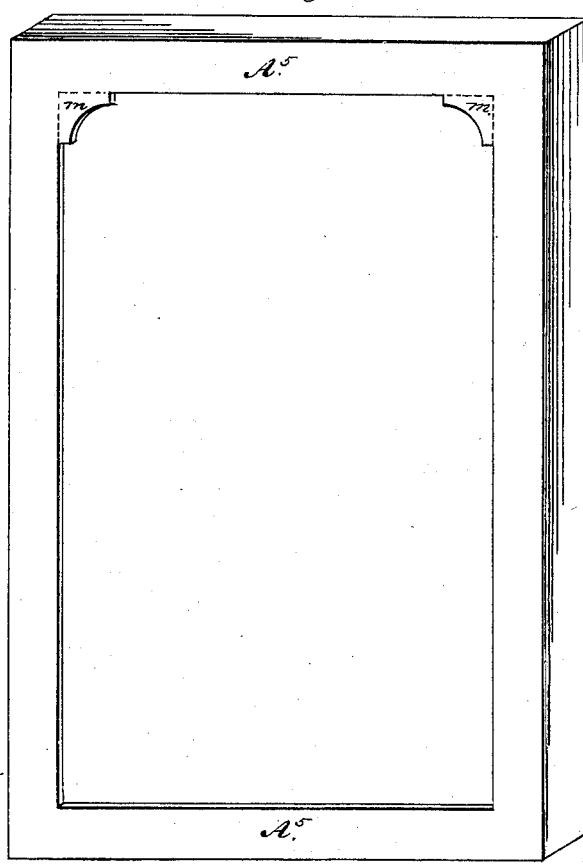

Fig. 18 shows an angle-iron frame with the upper corners provided with filling-pieces and the lower corners left square.

Having thus described my invention, what I claim, and desire to secure by Letters Patent, is—

1. In a safe, the door-frame and the door-flange, or either, made in sections of separate corner-pieces and intermediate filling-pieces, constructed substantially as shown and specified.

2. The manner of securing the back C of a safe in place by means of spring-pieces $k$, angle-pieces $i$, and angle-iron frame $A^5$, substantially as set forth.

3. The combination of the back C, springs $k$, and bar, substantially as set forth.

4. The inner wire-gauze or reticulated screen or door attached to the main safe-door or to the door-frame by means of hinges or otherwise, substantially as shown and described.

5. The door-flange or door-frame herein described, consisting of the corner-pieces $b$ and intermediate filling-pieces $d$, made step shape, substantially as specified.

6. In a safe the angle-iron frame $A^5$, having its corners strengthened by the corner-pieces $m$, substantially as set forth.

7. The safe, herein described, consisting of angle-pieces $A^5$, back C, door and frame B, corner-pieces $b$, and filling-pieces $d$, all constructed and arranged substantially as set forth.

In testimony that I claim the foregoing as my own I affix my signature in presence of two witnesses.

WILLIAM H. BUTLER.

Witnesses:
BENJAMIN SHIEVE,
MARTIN J. REILEY.